March 5, 1963  D. O. GREENHAW  3,080,147
HYDRAULIC JACK
Filed Feb. 9, 1962  2 Sheets-Sheet 1
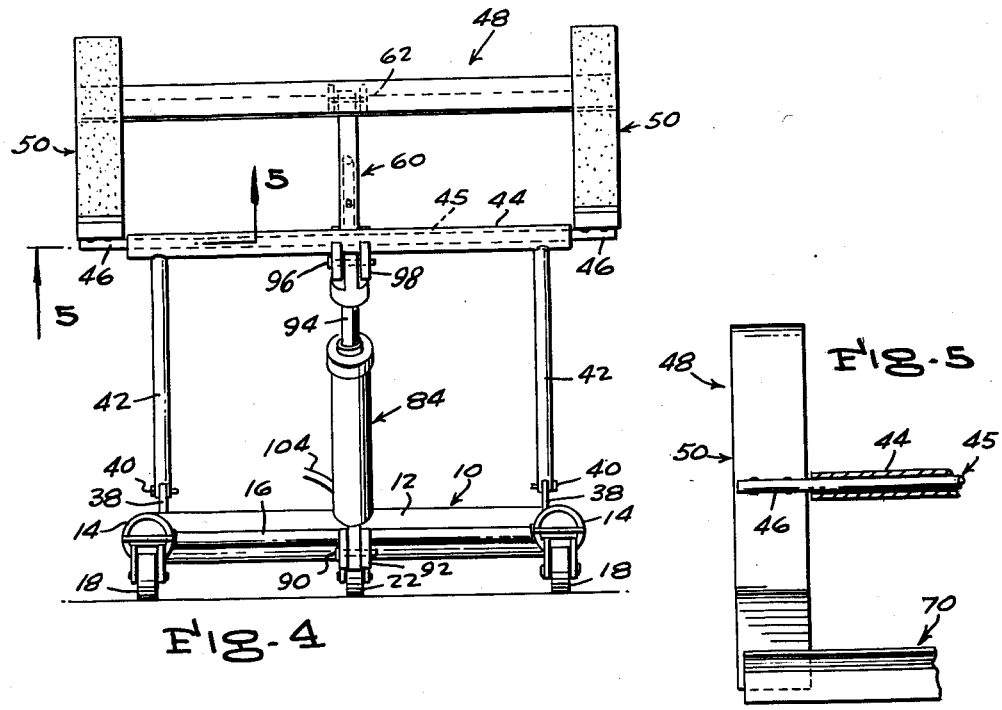
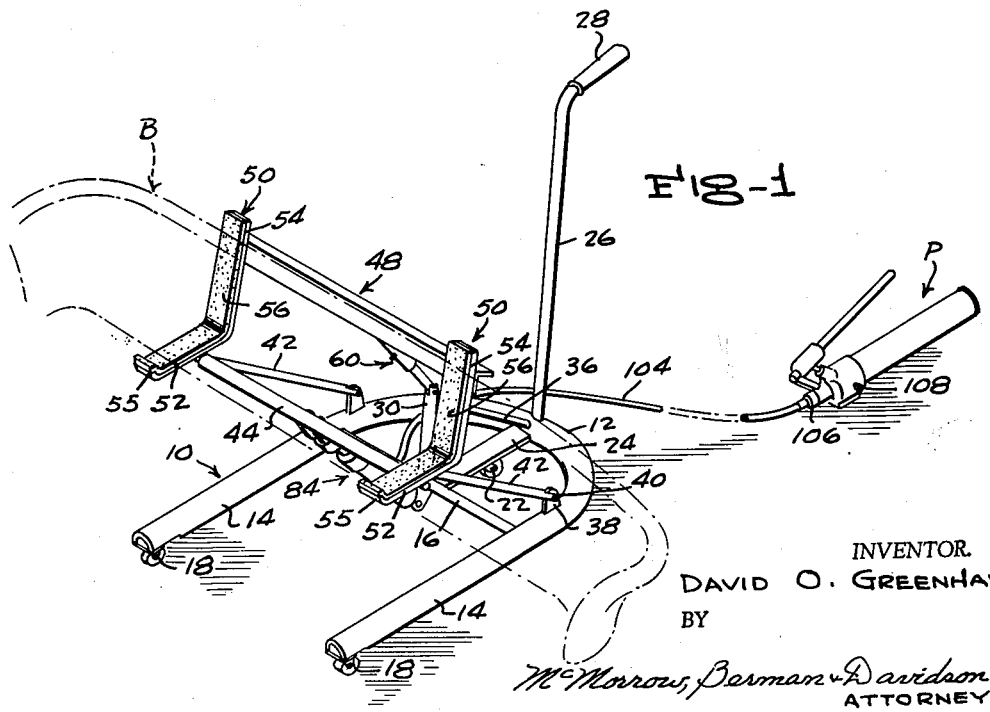
INVENTOR.
DAVID O. GREENHAW
BY
McMorrow, Berman & Davidson
ATTORNEYS March 5, 1963  D. O. GREENHAW  3,080,147
HYDRAULIC JACK
Filed Feb. 9, 1962  2 Sheets-Sheet 2
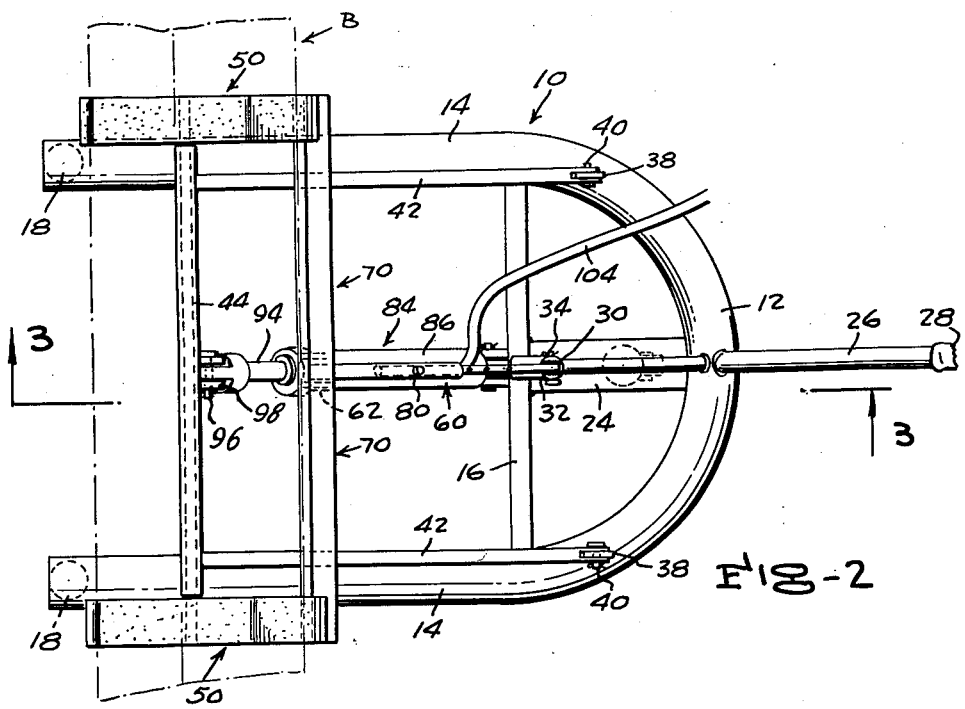
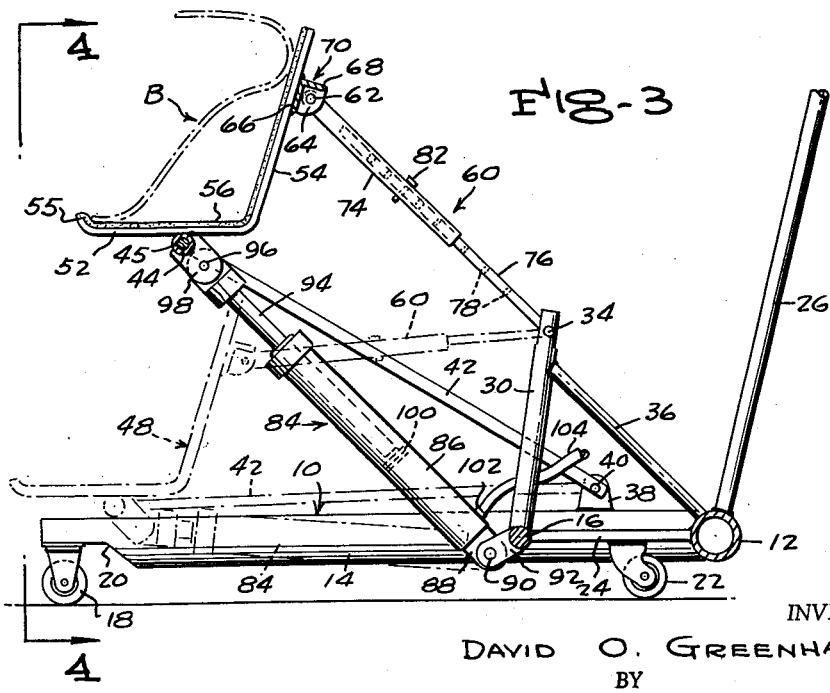
INVENTOR.
DAVID O. GREENHAW
BY
McMorrow, Berman & Davidson
ATTORNEYS

United States Patent Office 3,080,147
Patented Mar. 5, 1963

3,080,147
HYDRAULIC JACK
David O. Greenhaw, Rte. 8, Athens, Ala.
Filed Feb. 9, 1962, Ser. No. 172,260
11 Claims. (Cl. 254—2)

This invention relates to a novel hydraulic jack, especially but not exclusively for service station and garage use in elevating and positioning automobile bumper bars, body doors, and the like, for installation on automobiles.

The primary object of the invention is the provision of an efficient, easy operating, wheel supported jack of the kind indicated, which is rugged and mechanically stable and of relatively simple and inexpensive construction, and, which, in the case of installing a bumper bar on an automobile, eliminates the trouble and labor of the use, otherwise necessary, of the services of two men and/or two jacks.

Another object of the invention is the provision, in a jack of the character indicated above, of a transversely elongated horizontal cradle, of L-shaped cross section including a horizontal arm and a vertical arm which is inclined at a slight angle away from the horizontal arm and serves as an over-center prop for an object resting upon the horizontal arm, the cradle being angularly adjustable, on a horizontal axis, to accommodate the cradle to objects of different contours, with the object safely overbalanced against the vertical arm, while being elevated toward the place for its installation.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view of a hydraulic jack of the present invention, showing a hydraulic hand pump operatively connected thereto, as an optional source of fluid under pressure;

FIGURE 2 is a top plan view of the jack;

FIGURE 3 is a vertical longitudinal section taken on the line 3—3 of FIGURE 2, showing an automobile bumper bar, in phantom lines, supported on the cradle;

FIGURE 4 is a front elevation of the jack taken from the line 4—4 of FIGURE 3; and FIGURE 5 is an enlarged fragmentary horizontal section taken on the line 5—5 of FIGURE 4.

Referring in detail to the drawings, wherein like numerals designate like parts throughout the several views, the illustrated jack comprises a U-shaped horizontal base frame 10, having an arcuate bight portion 12 from whose ends parallel spaced legs 14 extend forwardly. A cross bar 16 extends between and is fixed to the legs 14 near to the ends of the bight portion 12. Forward caster wheels 18 are suitably fixed to the undersides of the legs adjacent to their forward ends, in recesses 20. A single rear caster wheel 22 is suitably fixed to the underside of a longitudinal strut 24 which extends between and is received centrally to the cross bar 16 and the bight portion 12. An upstanding rod 26 is suitably fixed, at its lower end, to the center of the bight portion 12, and has a rearwardly extending handle 28, on its upper end. The rod 26, as shown in FIGURE 3, is disposed at a slight upward and rearward angle.

A tubular standard 30 is fixed to and rises centrally from the cross bar 16 and is disposed at a slight rearward angle, and has, at its upper end, a vertical slot 32 which opens to the upper end of the standard, with a pivot pin 34 extending through the standard and across the slot 32. A rearwardly and downwardly angled brace bar 36 extends between and is suitably fixed to the upper part of the standard 30 and the middle of the bight portion 12.

Fixed on and upstanding from the ends of the bight portion 12 are ears 38, to which are pivoted, as indicated at 40, the depressed rear ends of forwardly and upwardly inclined levers 42, which reach forwardly beyond the standard 30. A transverse bearing tube 44, longer than the distance between the levers 42, is suitably fixed on the elevated forward ends of the levers, and has end portions reaching laterally outwardly from the levers. A rotary shaft 45 extends through the tube 44, and has end portions 46 extending outwardly of the ends of the tube. The shaft 45 is a component of a transversely elongated cradle 48.

The cradle 48 comprises a pair of laterally spaced L-shaped brackets 50, having horizontally disposed legs 52, which extend forwardly from the lower ends of vertical legs 54. The vertical legs 54 are rearwardly inclined, relative to the horizontal legs 52, at a slight angle, so that the vertical legs serve as props to be engaged by an object, such as an automobile bumper bar B, resting upon the horizontal legs behind upturned chocks 55 on their forward ends, and over-balanced against the vertical legs. The tops of the horizontal legs and the forward sides of the vertical legs are covered by pads 56 of such as canvas or rubber, for harmless contact with objects. The horizontal legs 52 are suitably affixed, intermediate their ends, as indicated at 58, upon the end portions 46 of the shaft 45. The shaft ends 46 are suitably fixed to the undersides of the horizontal legs 52 of the cradle brackets 50.

A rearwardly and downwardly angled lengthwise adjustable brace 60 is pivoted, at its elevated forward end, as indicated at 62, between ears 64 which extend between the vertical and horizontal flanges 66 and 68, respectively, of a transverse angle iron bar 70, which extends between and has its vertical flange 66 suitably affixed to the rear surfaces of upper portions of the vertical legs 54 of the cradle brackets 50. The depressed rear end of the brace 60 is pivoted, in the standard slot 32, on the pivot pin 34.

The brace 60 is composed of a tubular forward section 74 and a rear rod section 76, which slides in the forward section, and has longitudinally spaced holes 78, which are selectively registrable with a single hole 80 in the forward section to receive a headed pin 82, for locking the sections in adjusted relationship. The brace 60 is made adjustable in order that the vertical legs 54 and the horizontal legs 52 of the cradle brackets 50 can be given angles necessary to supportably engage objects of different shapes and contours, in the manner hereinabove outlined. Such adjusted angulations of the cradle 48 are maintained by the brace 60, in depressed, intermediate, and elevated positions of the cradle 48.

The cradle 48 is elevated and depressed relative to the base frame 10, as indicated in full and in phantom lines in FIGURE 3, by means of a hydraulic jack 84. The jack 84 comprises a cylinder 86 having an ear 88 on its rear end which is pivoted, as indicated at 90, to a lug 92 which is fixed to and extends at a forward and downward angle from the middle of the base frame cross bar; and a piston rod 94 working through the forward end of the cylinder. The piston rod 94 is pivoted, at its forward end, as indicated at 96 between the arms of a clevis 98, which is suitably fixed to the center of and extends rearwardly and downwardly from the bearing tube 44. The piston rod 94 carries a piston 100 which works between the ends of the cylinder 86.

The cylinder 86 has a nipple 102, adjacent to its lower end, on which is secured an end of a hose 104, whose other end is secured on a nipple 106, on a hydraulic hand pump P, or other suitable source of fluid under pressure, which, when introduced into the lower end of the cylinder, forces the piston rod 94 forwardly out of the cylinder 86, and elevates the cradle 48 above the base frame 10, to the desired level above the floor or ground. Means for discharging the fluid from the cylinder 86 can comprise a valve 108, on the pump P, or a similar valve (not shown) on the jack cylinder 86, whereby the cradle 48 is permitted to subside toward the base frame 10.

It will be seen from the foregoing that the above described jack is adapted to be easily and accurately guided, over a floor or the ground, by means of the handle 28, with the object, such as the bumper bar B, safely supported in the cradle 48, for accurately positioning the object at a desired height and location for its installation, without having to touch the object, except as may be required for the installation.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A jack comprising a horizontal wheeled base frame, a vertically elongated standard fixed on and rising from the base frame, a brace pivoted at one end on the standard at a point spaced above the base, a cradle pivoted on the other end of the brace, an extensible jack beneath the brace and pivoted at one end to the base frame adjacent to the lower end of the standard and pivoted at its other end to the cradle at a point spaced below the pivotal connection of the brace with the cradle, and lever means pivoted at one end to the base frame and at the other end thereof to the cradle at a location adjacent to said other end of the jack.

2. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at its other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft.

3. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at its other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft, said cradle comprising bracket means having a normally horizontal leg and a vertical leg, the vertical leg being inclined away from the horizontal leg.

4. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at its other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft, said cradle comprising bracket means having a normally horizontal leg and a vertical leg, the vertical leg being inclined away from the horizontal leg, said brace being longitudinally adjustable for varying the angle relative of the cradle to the ground on the axis of said shaft.

5. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at the other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft, said cradle comprising bracket means having a normally horizontal leg and a vertical leg, the vertical leg being inclined away from the horizontal leg, said brace being longitudinally adjustable for varying the angle relative of the cradle to the ground on the axis of said shaft, the base frame being U-shaped and having a bight portion and parallel spaced legs, said lever means comprising single levers pivoted at said one end to the base frame legs, the base frame having a cross bar extending between its legs, from which said standard rises.

6. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at the other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft, said cradle comprising bracket means having a normally horizontal leg and a vertical leg, the vertical leg being inclined away from the horizontal leg, said brace being longitudinally adjustable for varying the angle relative of the cradle to the ground on the axis of said shaft, the base frame being U-shaped and having a bight portion and parallel spaced legs, said lever means comprising single levers pivoted at said one end to the base frame legs, the base frame having a cross bar extending between its legs, from which said standard rises, said bearing tube extending between and fixed to the other ends of the levers.

7. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at the other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft, said cradle comprising bracket means having a normally horizontal leg and a vertical leg, the vertical leg being inclined away from the horizontal leg, said brace being longitudinally adjustable for varying the angle relative of the cradle to the ground on the axis of said shaft, the base frame being U-shaped and having a bight portion and parallel spaced legs, said lever means comprising single levers pivoted at said one end to the base frame legs, the base frame having a cross bar extending between its legs, from which said standard rises, said bearing tube extending between and fixed to the other ends of the levers, said shaft having end portions extending beyond the ends of the bearing tube to which the cradle is fixed.

8. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at the other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft, said cradle comprising bracket means having a normally horizontal leg and a vertical leg, the vertical leg being inclined away from the horizontal leg, said brace being longitudinally adjustable for varying the angle relative of the cradle to the ground on the axis of said shaft, the base frame being U-shaped and having a bight portion and parallel spaced legs, said lever means comprising single levers pivoted at said one end to the base frame legs, the base frame having a cross bar extending between its legs, from which said standard rises, said bearing tube extending between and fixed to the other ends of the levers, said shaft having end portions extending beyond the ends of the bearing tube to which the cradle is fixed, the cradle bracket means comprising a pair of transversely spaced brackets having their horizontal legs fixed to the end portions of the shaft, and a transverse bar extending between and fixed to the vertical legs of the brackets, the brace being pivoted to the transverse bar.

9. A jack comprising a horizontal wheeled base frame, an upstanding standard fixed on the base frame, a brace pivoted at one end on the standard, a cradle pivoted on the upper end of the brace, an extensible jack beneath the brace and pivoted at one end to the base frame and pivoted at the other end to the cradle at a point spaced below the pivotal connection of the brace with the cradle, and lever means pivoted at one end to the base frame and at the other end thereof to the cradle, a bearing tube to which the extensible jack is pivoted, a rotary shaft extending through the tube, said cradle being supportably fixed to the shaft, said cradle comprising bracket means having a normally horizontal leg and a vertical leg, the vertical leg being inclined away from the horizontal leg, said brace being longitudinally adjustable for varying the angle relative of the cradle to the ground on the axis of said shaft, the base frame being U-shaped and having a bight portion and parallel spaced legs, said lever means comprising single levers pivoted at said one end to the base frame legs, the base frame having a cross bar extending between its legs, from which said standard rises, said bearing tube extending between and fixed to the other ends of the levers, said shaft having end portions extending beyond the ends of the bearing tube to which the cradle is fixed, the cradle bracket means comprising a pair of transversely spaced brackets having their horizontal legs fixed to the end portions of the shaft, and a transverse bar extending between and fixed to the vertical legs of the brackets, the brace being pivoted to the transverse bar, said brace comprising telescoped sections, and means for locking the sections in adjusted relationship.

10. A jack comprising a base frame, a fixed standard rising from the base frame, a normally upwardly angled brace having a depressed end pivoted on the standard, a cradle pivoted on the elevated end of the brace, normally upwardly angled lever means having a depressed end pivoted to the base, the elevated end of the lever means being pivoted to the cradle on a level below the elevated end of the brace, and a normally upwardly angled extensible jack having a depressed end pivoted to the base in the region of the standard, and means pivoting the elevated end of the jack to the cradle on an axis spaced below the elevated end of the lever means.

11. A jack comprising a base frame, a fixed standard rising from the base frame, a normally upwardly angled brace having a depressed end pivoted on the standard, a cradle pivoted on the elevated end of the brace, normally upwardly angled lever means having a depressed end pivoted to the base, the elevated end of the lever means being pivoted to the cradle on a level below the elevated end of the brace, and a normally upwardly angled extensible jack having a depressed end pivoted to the base in the region of the standard, and means pivoting the elevated end of the jack to the cradle on an axis spaced below the elevated end of the lever means, said brace being longitudinally adjustable.

References Cited in the file of this patent

UNITED STATES PATENTS

| | | |
|---|---|---|
| 1,819,378 | Nilson | Aug. 18, 1931 |
| 2,036,654 | Stieler | Apr. 7, 1936 |
| 2,512,150 | Geren | June 20, 1950 |
| 2,605,999 | Schultz | Aug. 5, 1952 |
| 2,785,807 | Prowinsky | Mar. 19, 1957 |